United States Patent [19]

Takita et al.

[11] 4,293,866

[45] Oct. 6, 1981

[54] RECORDING APPARATUS

[75] Inventors: Seiki Takita; Kiyomi Ichizuka, both of Tokyo, Japan

[73] Assignee: Ricoh Co., Ltd., Tokyo, Japan

[21] Appl. No.: 99,835

[22] Filed: Dec. 3, 1979

[30] Foreign Application Priority Data

Dec. 13, 1978 [JP] Japan ................................ 53-154790

[51] Int. Cl.³ ............................................ G01D 15/18

[52] U.S. Cl. .................................. 346/140 R; 346/75

[58] Field of Search ........................... 346/75, 140 PD

[56] References Cited

U.S. PATENT DOCUMENTS 1,817,098 8/1931 Ranger et al. ................ 346/75 UX 3,898,670 8/1975 Erikson et al. ................... 346/75 X 4,143,381 3/1979 Downie ............................ 346/75 X

OTHER PUBLICATIONS

Damm Jr., Nonclogging Ink-Jet Printer, IBM Technical Disclosure Bulletin, p. 1191, vol. 15, No. 4, Sep. 1972.

*Primary Examiner*—George H. Miller, Jr.

*Attorney, Agent, or Firm*—Burgess, Ryan & Wayne

[57] ABSTRACT

A recording apparatus wherein a liquid drop generator issues liquid drops which are steered to a strike at desired spots on an intermediate means so as to form a printing image to be transferred onto a recording sheet brought into contact therewith. The intermediate means includes a dye or pigment carrying layer, and the dye or pigment at the spot on the layer which has been wetted or moistened with the liquid drop becomes transferable to the recording sheet together with the liquid, whereby a visible printing image may be transferred onto the recording sheet.

5 Claims, 16 Drawing Figures

RECORDING APPARATUS

BACKGROUND OF THE INVENTION

The present invention relates to a recording apparatus or system which is similar in some respects to the conventional ink-jet printing systems.

In general, the conventional ink-jet printing systems may be divided into the ink-on-demand type and the electrostatic deflection type. In both types, the ink drops of very small diameters are issued from the print head and steered to the desired spots on a recording sheet, thereby forming characters, patterns and the like. The ink drops are issued in general from a nozzle with an extremely fine nozzle hole, and the ink used contains solid substances. As a result, the conventional ink-jet printing systems have a serious common defect that the clogging of nozzles tends to occur very frequently. That is, in inoperative mode the ink remains in the nozzle and the ink solvent continues to evaporate, leaving the rich concentration which clogs the nozzle hole. As a result, even when the ink-jet printer is started, no ink drop can issue from the nozzle or nozzles. In order to overcome this problem, there has been proposed to use a moistening agent to the ink so as to retard its vaporization. Alternatively, there has been proposed to use a cap to close the nozzle so as to prevent the evaporation in the inoperative mode. However, these and other counter-measures have proved unsatisfactory in practice because the inherent properties of the ink used are not taken into consideration.

As a consequence, used satisfactorily in practice is the so-called ink-dot systems which use only a small number of nozzles ranging from five to seven, but it is almost not feasible to provide, instead of the prior art printing systems such as electrophotographic machines, the ink-jet printing systems which employs a large number of nozzles ranging from hundreds to thousands so as to produce the prints or copies in large size.

SUMMARY OF THE INVENTION

The primary object of the present invention is therefore to provide a recording system which may completely avoid the clogging of nozzles or orifices even when a liquid used is evaporated during the inoperative mode.

Another object of the present invention is to provide a recording apparatus wherein the liquid drops are issued from nozzles or orifices to form a "liquid-drop image" on an intermediate means or a printing image developing and transfer means including a dye or pigment carrying layer. The dye or pigment at the spots on the layer which are wetted or moistened with the liquid drops becomes transferable to a recording sheet together with the liquid, whereby a visible printing image may be transferred onto the recording sheet which is made into contact with the intermediate means by for example an impression cylinder.

Briefly stated, the present invention is featured in the provision of a liquid drop generator which issues the drops of a liquid which will not precipitate any solid substances, an intermediate means carrying a dye or pigment which becomes transferable only when wetted or moistened with the liquid drops, the dye or pigment at the spots not wetted or moistened remaining untransferable, and a recording sheet made into contact with the intermediate means, whereby a visible printing image may be transferred onto the recording sheet.

Since the liquids which will not precipitate any solid substances are used in the present invention, the clogging of nozzles or orifices due to the evaporation of the liquid used may be completely avoided. When the intermediate means is printed with the liquid drop image, which is in general not visible, it develops a visible printing image which in turn is transferred onto a recording sheet. Thus, regardless of the number of nozzles or orifices used, no clogging problem will occur so that highly reliable and dependable operation may be ensured.

DESCRIPTION OF THE PREFERRED EMBODIMENTS

Figure 1:
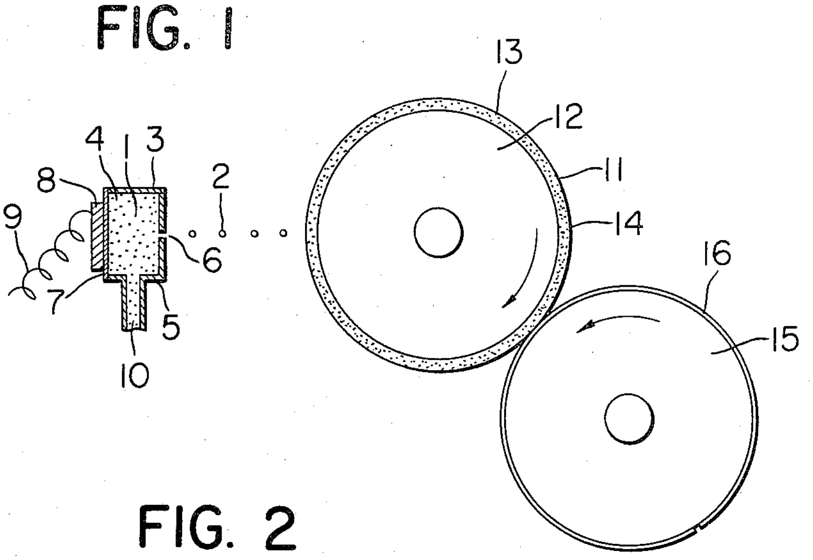
FIG. 1 is a schematic sectional view of a first embodiment of a recording apparatus in accordance with the present invention.

First Embodiment, FIG. 1

Referring to FIG. 1, a first embodiment of a recording apparatus in accordance with the present invention comprises in general water drop generating means 3, an intermediate means 11 and an impression drum or cylinder 15.

The water drop generating means or a print head 3 comprises a water manifold 4 which contains water 1, most preferably ion-exchanged water, as a liquid which will not precipitate any solid substances and which is communicated through a pipe 10 to a water source (not shown), an orifice 6 of a very fine diameter which is formed through the front wall 5 of the water manifold 4 and a piezoelectric transducer or crystal 8 which is bonded on the rear wall 7 and electrically connected to digital image forming electronics (not shown) with a lead wire 9. The stream of water jet issues from the orifice 6 and breaks into water drops 2. The water drop generating means 3 is so arranged as to move widthwise or in the axial direction of the intermediate means 11 so as to scan it.

The intermediate means 11 which is disposed in opposed relationship with the water drop generating means 3 comprises in general an intermediate drum or a printing image developing and transfer drum 12 surfaced with a dye carrier layer 13 which carries a substance such as a water-soluble dye which, when wetted or moistened with the water drops 2, may be printed or transferred on a recording sheet 16. In the first embodiment, the water-soluble dye carried by the dye layer 13 is not limited, but it is preferable that the dye may be readily soluble in water and that in order to attain sharp contrast the dye is black or blue. For instance, the black dyes are C.I.DIRECT BLACK 17, 38 and 51 and ACID BLACK 2, 7, 24, 31, 52, 107, 118, 119 and 156. The blue dyes are for instance C.I.DIRECT BLUE 1, 6, 15, 25, 71, 86 and 226, C.I.ACID BLUE 9, 62, 104, 113, 117 and 120 C.I.BASIC BLUE 1, 3, 57, 9 and 28. Thus the spot 14 which is wetted or moistened with the water drop 2 impinging thereat may become transferable to the recording sheet 16.

Instead of the dye layer, the carrier made of a porous material such as ceramic, paper or the like and impregnated with a suitable dye may be used in order to inhibit the spreading of the water drop over the dye layer and to facilitate the solving of the dye.

The recording sheet 16 is releasably clamped around the impression drum 15 which is disposed for rotation at one side of the printing-image-developing-and-transfer drum 11.

In response to the image forming signal, the piezoelectric transducer 8 is energized in synchronism with the rotation of the intermediate drum or means 11 so that the stream of water jet issues from the orifice 6 and breaks into the water drops 2 which travels towards and strikes against the dye carrying layer 13 of the intermediate means or drum 11. The wetted or moistened spots 14 are transferred to the recording sheet 16 on the impression drum 15, whereby a visible image may be recorded or printed.

In inoperative mode, the water evaporates, but it will not precipitate any solid substances as described elsewhere so that the clogging of the orifice 6 may be completely avoided. As a result, the recording device may be started at any time even after a long period of inoperative mode.

Figure 2:
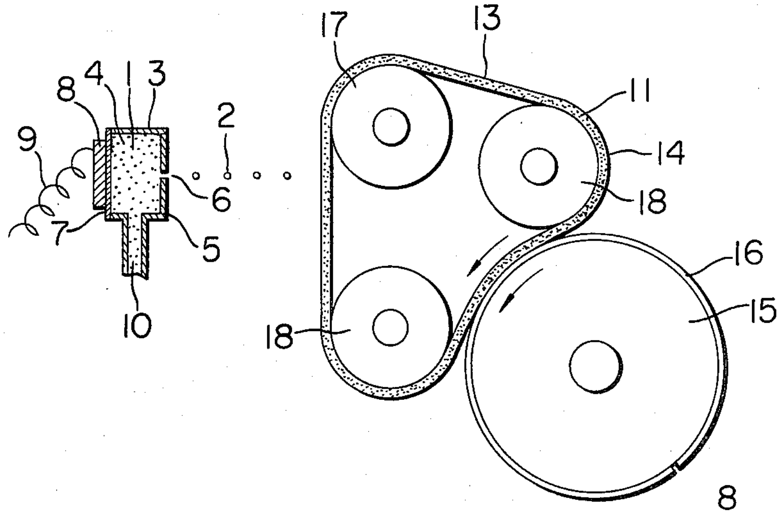
FIG. 2 is a schematic sectional view of a second embodiment of the present invention.

Second Embodiment, FIG. 2

The second embodiment shown in FIG. 2 is substantially similar in construction to the first embodiment except the construction of the intermediate means 11. According to the second embodiment, the intermediate means 11 is in the form of an endless belt wrapped around a driving wheel 17 and two driven or guide wheels 18.

In the first as well as the second embodiment, the recording sheet 16 has been described as being clamped around the impression drum 15, but it is to be understood that the flat recording sheet may be pressed against the intermediate means 11 for printing image transfer.

Figure 3:
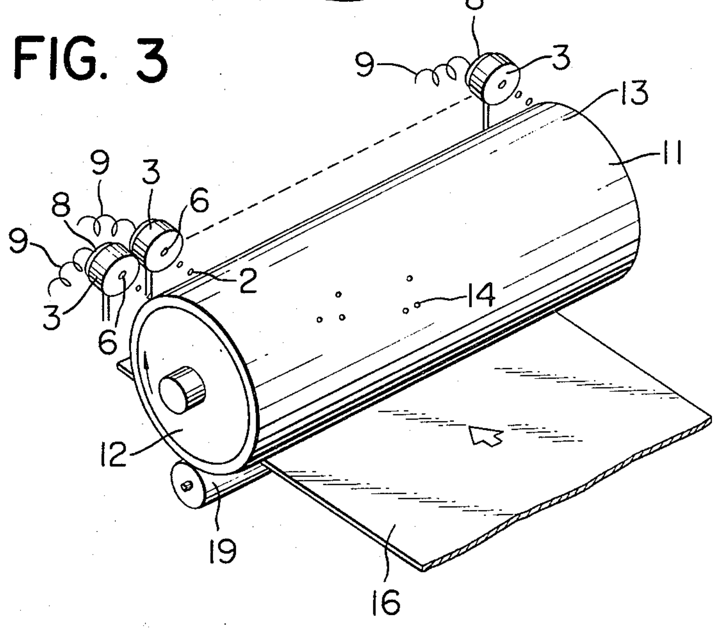
FIG. 3 is a perspective view of a third embodiment of the present invention.

Third Embodiment, FIG. 3

The third embodiment shown in FIG. 3 is also substantially similar in construction to the first embodiment shown in FIG. 1 except that a plurality of print heads or water drop generating means 3 are arrayed in the axial direction of the intermediate means or drum 11. In FIG. 3 an array of water drop generating means 3 is shown, but it is to be understood that a multi-orifice or -nozzle water drop generating means may be used because the pitch between the orifices or nozzles 6 is extremely short so that the desired water drop image may be "printed" on the intermediate means or drum 11. According to the third embodiment, the water drop generating means or the multi-orifice or -nozzle print head 3 may be held stationary. That is, the movement of the water drop generating means or print head 3 along the intermediate means or drum 11 may be eliminated. In contrast to the first and second embodiment, the flat recording sheet 16 is delivered and pressed against the intermediate means or drum 11 by an impression roller 19.

Figure 4:
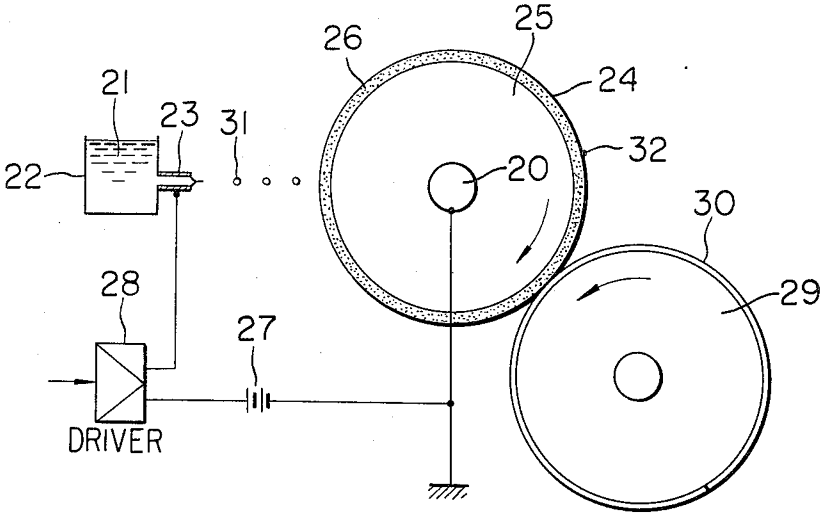
FIG. 4 is a schematic sectional view of a fourth embodiment of the present invention.

Fourth Embodiment, FIG. 4

The fourth embodiment shown in FIG. 4 is also substantially similar in construction to the first embodiment shown in FIG. 1 except that a voltage is applied between the nozzle of the water drop generating means or print head and the shaft of the intermediate means or drum. That is, the water drop generating means or print head comprises a water manifold 22 containing water 21 and having a nozzle 23. The nozzle 23 is made of an electrically conductive material and applied with the statistic hydraulic pressure of 10 mm Hg.

The intermediate means 24 comprises a drum 25 which is made of an electrically conductive material and surfaced with a dye carrying layer 26 which is substantially similar in construction to the dye carrying layer 13 described elsewhere in conjunction with the first embodiment shown in FIG. 1.

The intermediate means or drum 24 is spaced apart from the tip of the nozzle 23 of the print head by about 3 mm. The shaft of the intermediate means or drum 24 is grounded while the bias voltage of 2 KV is applied from a power source 27. In addition, the nozzle 23 is applied with the image forming signal of between 0 and 700 V from a driver or image forming electronic circuit 28.

The recording sheet 30 is removably wrapped around a delivery and impression drum or cylinder 29. Reference numeral 31 designates water drops; and 32, the spot wetted or moistened by the water drop.

In operation, the voltage image forming signal is applied from the driver 28 to the nozzle 23 so that because of the electrostatic induction between the nozzle 23 and the intermediate means or drum 24, the stream of water jet issues from the nozzle 23 and breaks into the water drops 31 which travel towards and strike against the dye carrying layer 32 on the intermediate means or drum 24. As a result, the printing image consisting of wetted or moistened spots 32 may be formed and transferred onto the recording sheet 30. Since the recording sheet 30 has the water absorbing capability, when it is made into contact with the dye carrying layer 32 of the intermediate means or drum 24, it readily absorb the water including the dye from the wetted or moistened spots 32 so that no image element may be transferred from the wetted or moistened spot 32 after the latter has been made into contact with the recording sheet 30. As a result, no spurious image may be formed.

Figure 5:
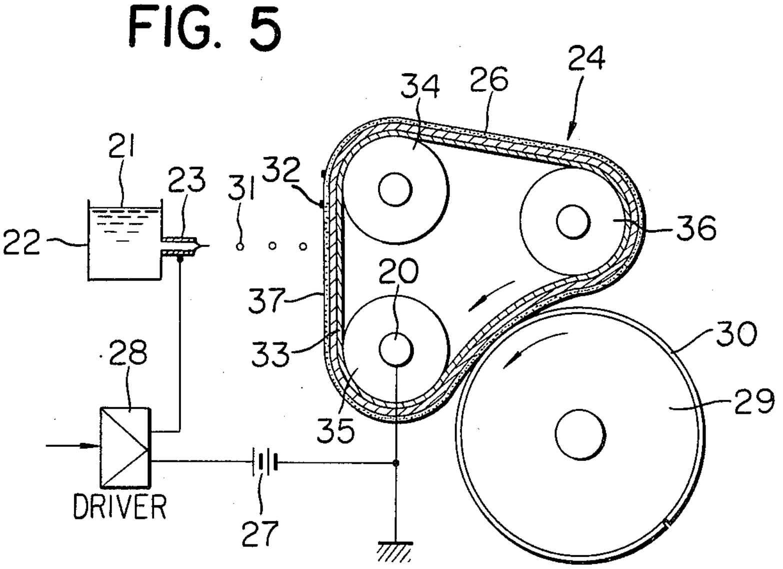
FIG. 5 is a schematic sectional view of a fifth embodiment of the present invention.
Figure 6:
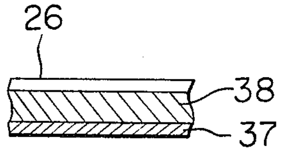
FIG. 6 is a fragmentary sectional view of an intermediate means in the form of an endless belt thereof.

Fifth Embodiment, FIGS. 5 and 6

The fifth embodiment shown in FIG. 5 is substantially similar in construction to the second embodiment shown in FIG. 2 except that a voltage is applied between the nozzle 23 of the water drop generating means or print head and the shaft 20 of a driven wheel 35. That is, the intermediate means 24 is in the form of an endless belt which is wrapped around a driving wheel 34 and driven wheels 35 and 36. The driven wheel 35 is made of an electrically conductive material and has the shaft 20 grounded. At least the inner surface of the endless belt 33 must be electrically conductive. That is, as best shown in FIG. 6, the endless belt 33 comprises a base 38 made of a thin metal sheet or a thin, electrically conductive sheet, a dye carrying layer 26 formed on the upper surface of the base 38 and an electrically conductive layer 37 formed over the lower surface of the base 38.

The mode of operation of the fifth embodiment is substantially similar to that described above. In both the fourth and fifth embodiments, the recording sheet 30 has been shown as being wrapped around the impression drum 29, but it is to be understood that the flat recording sheet may be made in contact with the intermediate means 24 or the endless belt 33.

Figure 7:
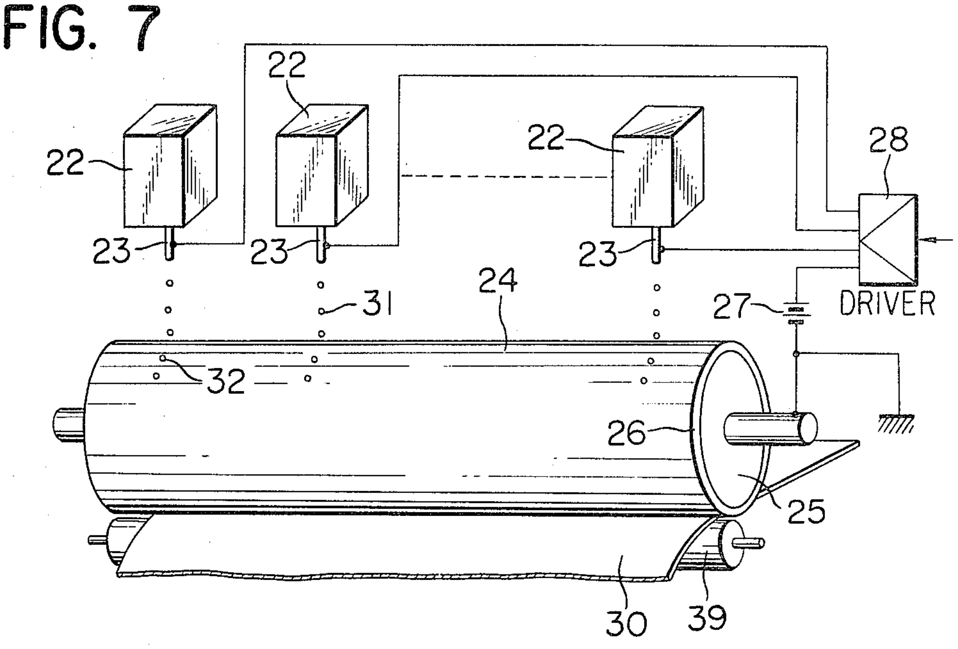
FIG. 7 is a diagrammatic perspective view of a sixth embodiment of the present invention.

Sixth Embodiment, FIG. 7

The sixth embodiment shown in FIG. 7 is substantially similar in construction to the fourth embodiment shown in FIG. 4 except that a plurality of water-drop-generating means 22 are arrayed in the direction parallel with the axis of the intermediate means or drum 24. Respective nozzles 23 of the water drop generating means 22 are electrically connected to the driver 28. In the sixth embodiment the flat recording sheet 30 is fed between the intermediate means or drum 24 and an impression cylinder 39.

Instead of a plurality of water drop generating means 22, a multi-nozzle or -orifice water drop generating means may be used as in the case of the third embodiment shown in FIG. 3.

With the multi-nozzle or -orifice arrangement, the movement of the water drop generating means may be eliminated and the water drop image forming speed may be much increased as with the third embodiment.

The embodiments described so far belong to the so-called water-on-demand system, but the embodiments to be described below belong to the so-called electrostatic system wherein a stream of water drops are independently steered to strike the recording sheet or a gutter.

Figure 8:
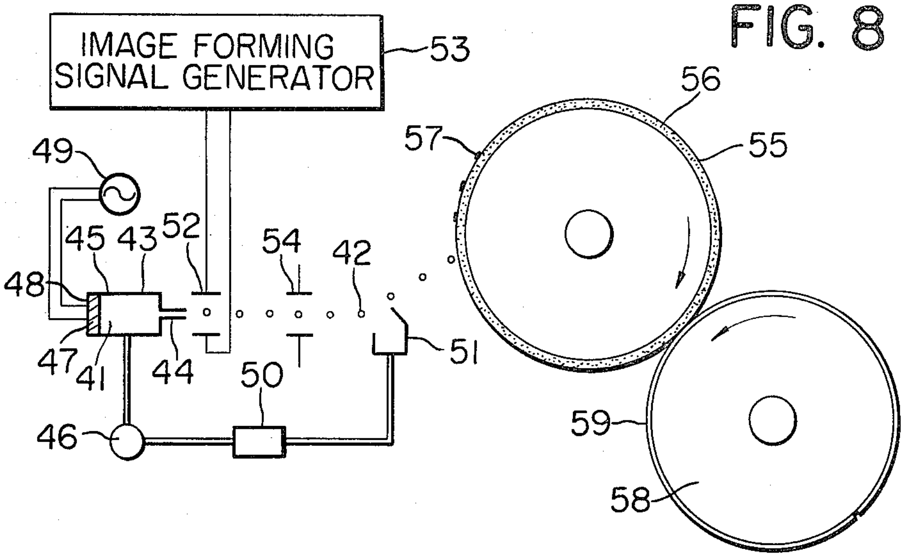
FIG. 8 is a schematic sectional view of a seventh embodiment of the present invention.

Seventh Embodiment, FIG. 8

The seventh embodiment shown in FIG. 8 comprises in general a print head, an intermediate means or drum 55, which is a printing image forming and transfer means, and a delivery-and-impression cylinder 58.

The print head includes a water drop generating means 43 comprising in general a water manifold 45 containing water and having a nozzle 44 and a piezoelectric transducer or crystal 48 mounted on the rear wall 47 of the water manifold 45 and electrically connected to a driven 49 so that the stream of water jet issuing from the nozzle 44 may break into water drops.

The printing head further includes a gutter 51 which traps unused water drops and the trapped water drops are recirculated through a tank 50 and a pump 46 to the water manifold 45.

A charge electrode 52 is disposed forwardly of the nozzle 44 and is electrically connected to an image forming signal generator 53 so that the charge acquired by each water drop may be controlled independently. Disposed forwardly of the charge electrode 52 is a deflection electrode pair 54 so that the charged water drops may be steered toward the intermediate cylinder 55 while the uncharged water drops may travel straight and be trapped by the gutter 51.

The intermediate means 55 comprises a drum surfaced with a dye carrying layer 56 of the type described elsewhere.

Disposed on one side of the intermediate cylinder or drum 55 is a delivery-and-impression cylinder 58 around which is removably wrapped and clamped the recording sheet 59 onto which is transferred the printing image formed on the dye carrying layer 56 of the intermediate cylinder 55 in a manner substantially similar to that described elsewhere.

In operation the breaking of the water jet issuing from the nozzle 44 into a stream of water drops 42 is synchronized with the image forming signal from the image forming signal generator 53 so that, as described above, the electric charge acquired by each water drop in the water drop steam 42 may be controlled independently of each other so that when each passes between the deflection plate pair 54, its deflection is controlled depending upon its charge. The deflected water drop travels towards and strikes the dye carrying layer 56 of the intermediate means or drum 55, thereby forming a wetted or moistened spot 57 which corresponds to a picture element. Thus the printing image is formed and transferred onto the recording sheet 59 in the manner described above.

During the printing operation, the print head is caused to move along the intermediate means or drum 55 so as to scan it.

The uncharged water drops travel straight and are trapped by the gutter 51 for recirculation as described elsewhere. Since the area of each water drop in contact with the surrounding air is relatively large so that the evaporation of water is facilitated and the absolute amount of the water drop is decreased, but no solid substances are precipitated. As a result, the clogging of the nozzle or orifice 44 may be avoided completely.

Figure 9:
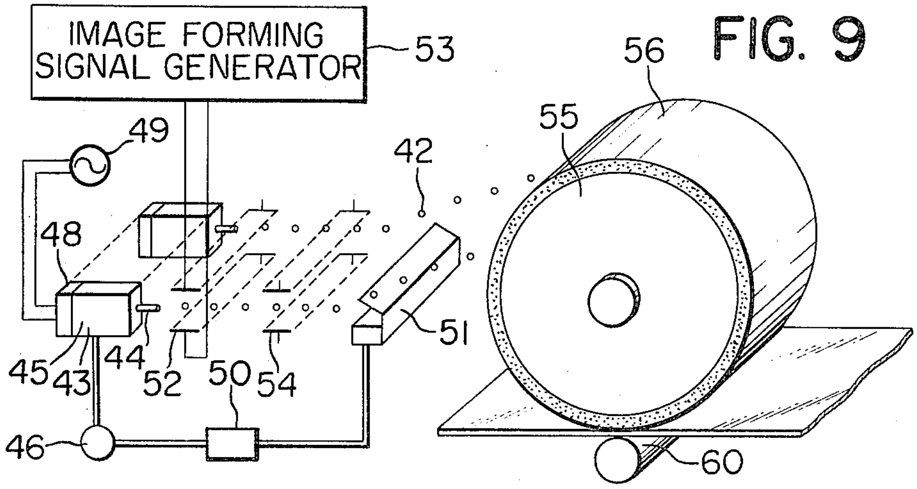
FIG. 9 is a schematic perspective view of an eighth embodiment of the present invention.

Eighth Embodiment, FIG. 9

The eighth embodiment shown in FIG. 9 is substantially similar in construction to the seventh embodiment just described above in conjunction with FIG. 8 except that a plurality of print heads are arranged in an array alongside the intermediate means or drum 55 in such a way that the nozzles or orifices 44 may be spaced apart from each other by a required pitch. The mode of operation is substantially similar to that described above in conjunction with the seventh embodiment with reference to FIG. 8 except that a flat recording sheet is delivered and made into contact with the intermediate means or drum 55 by an impression cylinder 60.

Figure 10:
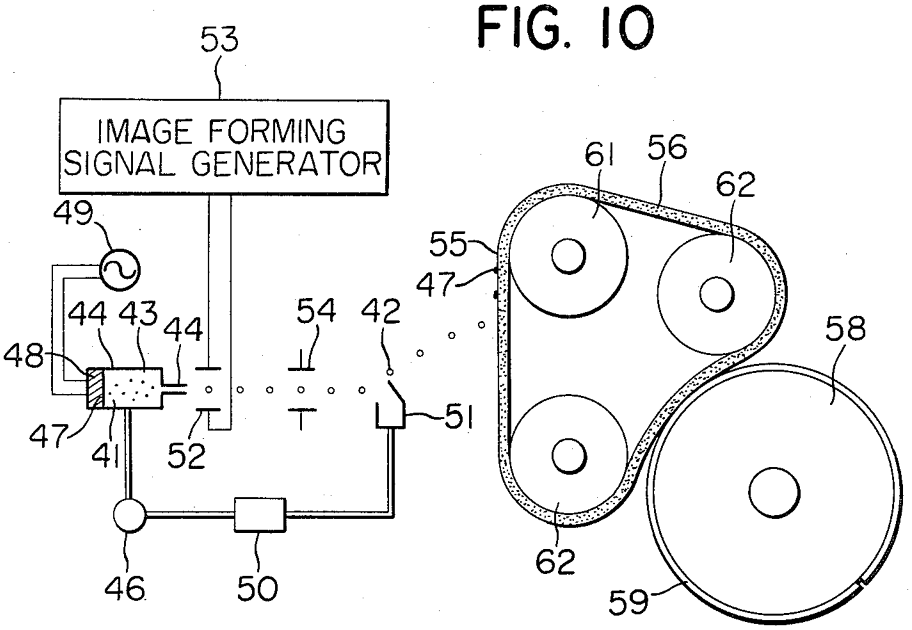
FIG. 10 is a schematic sectional view of a ninth embodiment of the present invention.

Ninth Embodiment, FIG. 10

The ninth embodiment shown in FIG. 10 is substantially similar in construction to the seventh embodiment shown in FIG. 8 except that the intermediate means 55 is in the form of an endless belt as with the second embodiment described in conjunction with FIG. 2.

That is, the intermediate means or the endless belt 55 is wrapped around a driving wheel or roller 61 and driven rollers 62, and the recording sheet 59 wrapped and clamped around the delivery-and-impression cylinder 58 is made into contact with the endless belt 55 so that the printing image may be transferred to the recording sheet 59.

Figure 11:
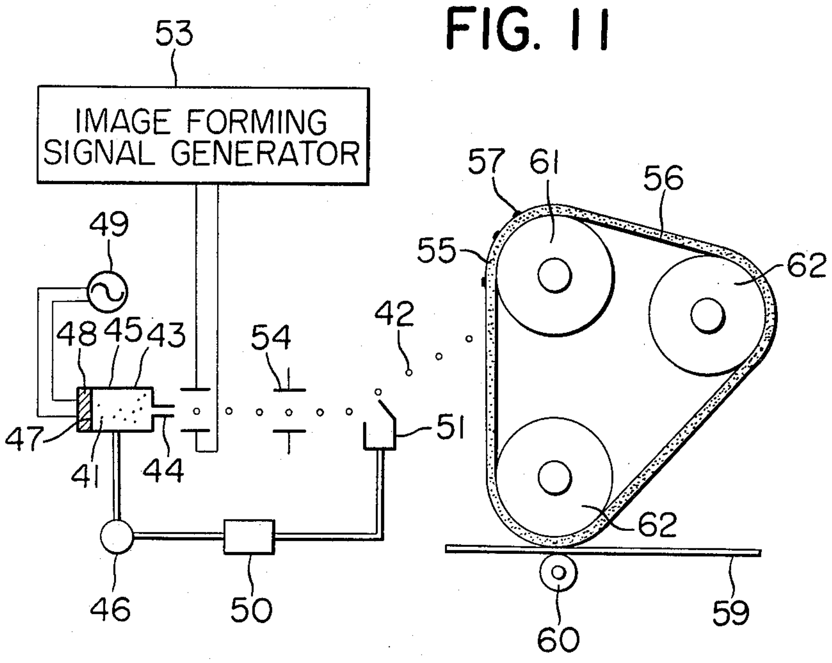
FIG. 11 is a schematic side view of a tenth embodiment of the present invention.

Tenth Embodiment, FIG. 11

The tenth embodiment shown in FIG. 11 is substantially similar in construction to the ninth embodiment just described above except that a flat recording sheet 59 is fed and pressed against the intermediate endless belt 55 by the impression cylinder 60.

In both the ninth and tenth embodiments, instead of the single print head, a multi-nozzle or -orifice print head may be used.

Figure 12:
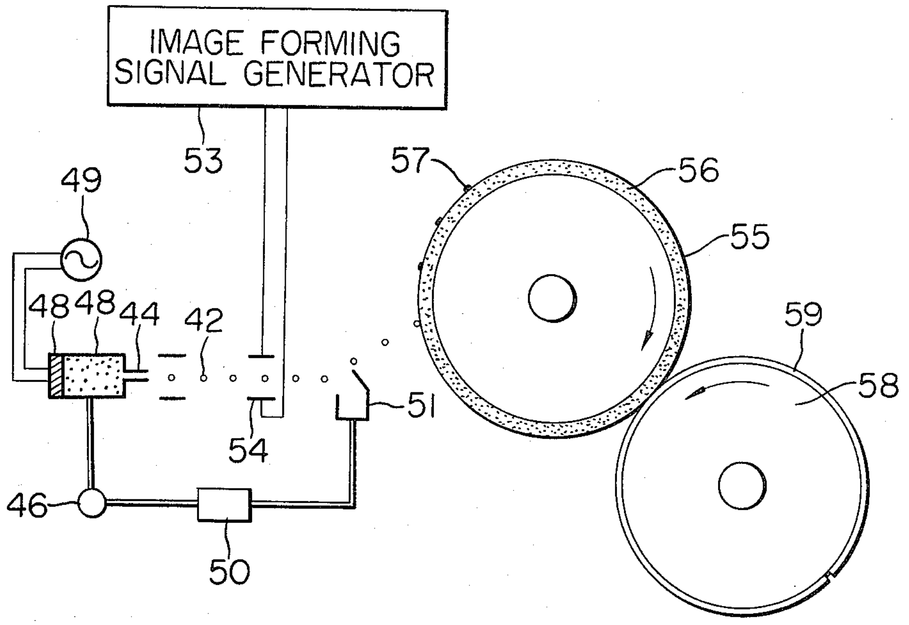
FIG. 12 is a schematic side view, partly in section, of a eleventh embodiment of the present invention.

Eleventh Embodiment, FIG. 12

The eleventh embodiment shown in FIG. 12 is substantially similar in construction to the seventh embodiment shown in FIG. 8 except that the image forming signal generator 52 is connected to the deflection plates 54 instead of the charge electrode 52. The mode of operation may be readily understood from the description thereof in conjunction with the seventh embodiment with reference to FIG. 8.

Figure 13:
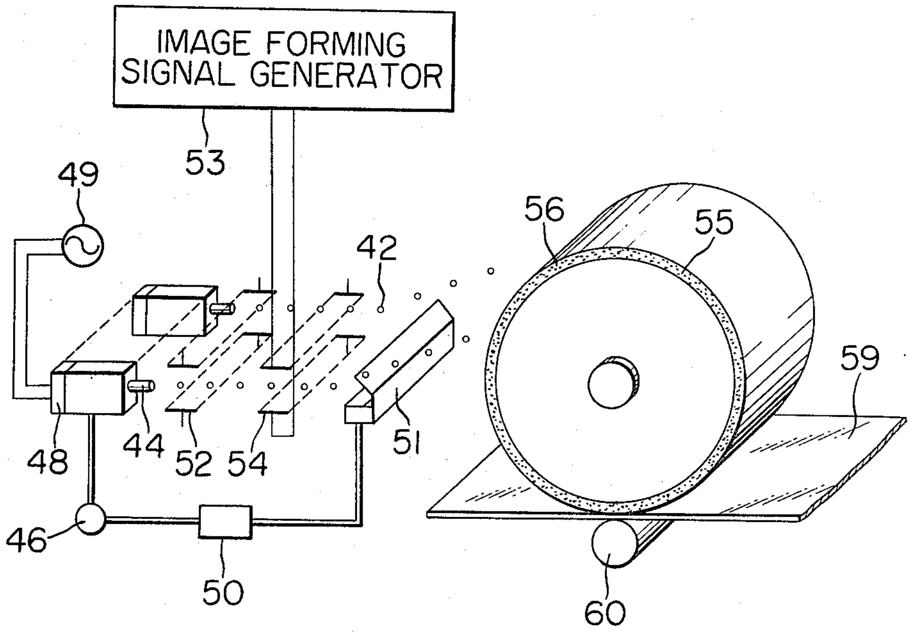
FIG. 13 is a schematic perspective view of a twelfth embodiment of the present invention.
Figure 14:
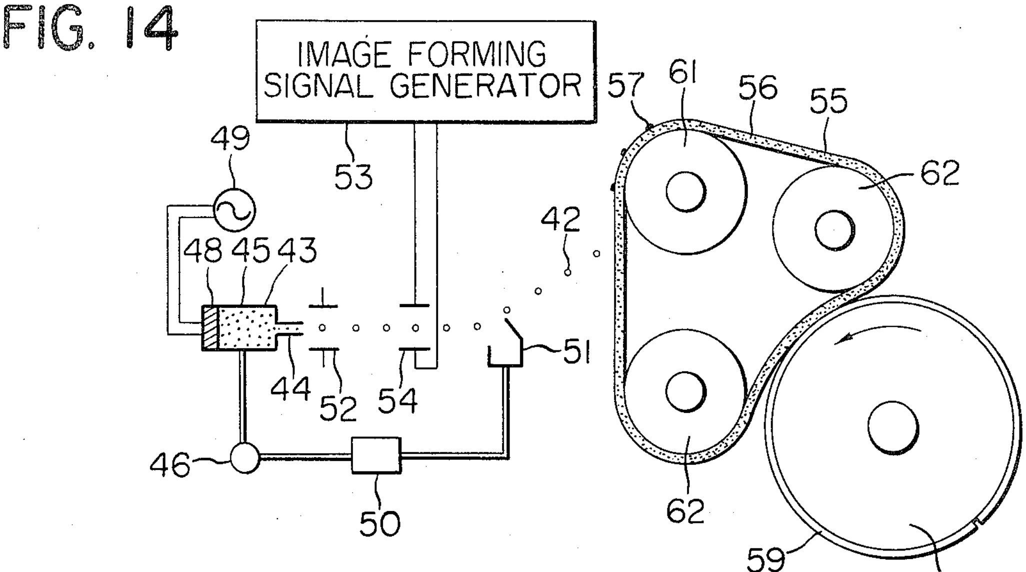
FIG. 14 is a schematic side view, partly in section, of a thirteenth embodiment of the present invention.
Figure 15:
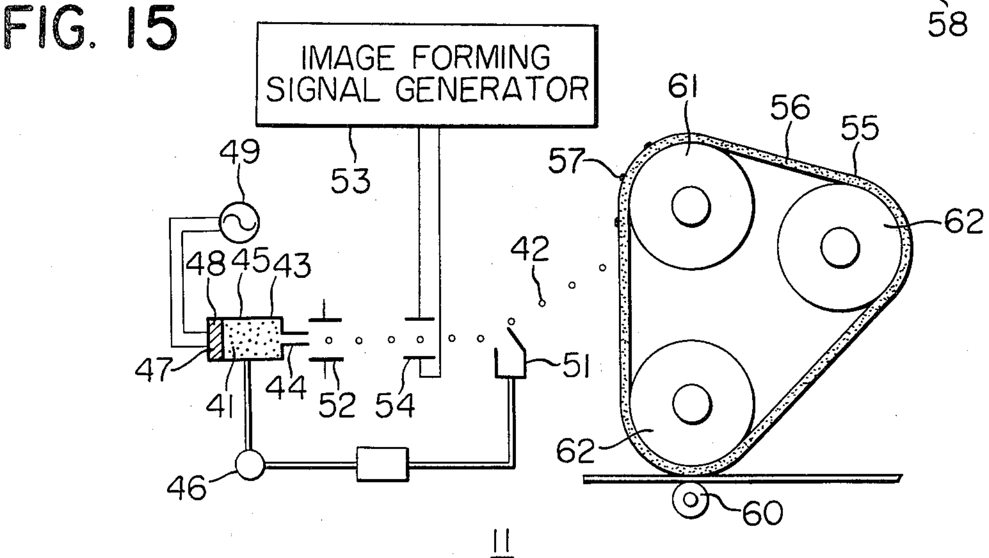
FIG. 15 is a schematic side view, partly in section, of a fourteenth embodiment of the present invention.

Twelfth, thirteenth and fourteenth Embodiment, FIGS. 13, 14 and 15

The twelfth, thirteenth and fourteenth embodiments shown in FIGS. 13, 14 and 15, respectively, are substantially similar in construction to the eighth, ninth and tenth embodiments, respectively, shown in FIGS. 9, 10 and 11, respectively, except that the image forming signal generator 53 is connected to the deflection plates 54 instead of the charge electrode 52 in each print head.

Figure 16:
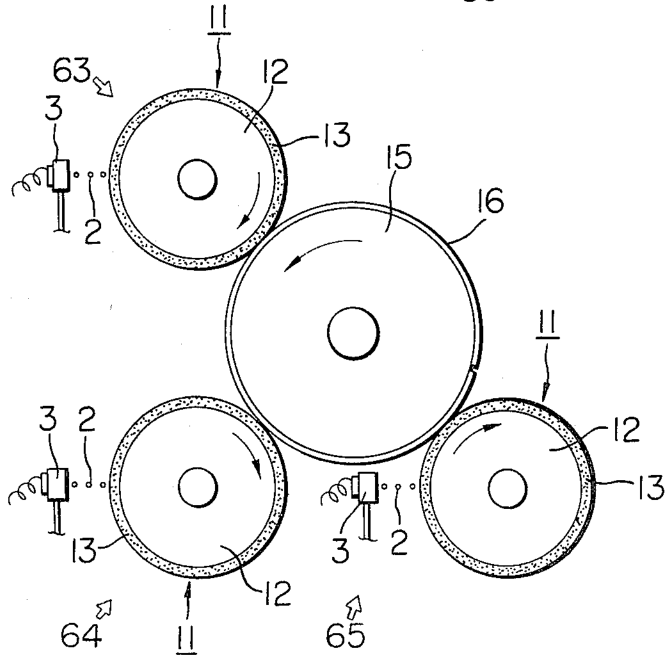
FIG. 16 is a schematic side view of a fifteenth embodiment of the present invention.

Fifteenth Embodiment, FIG. 16

The fifteenth embodiment shown in FIG. 16 is substantially similar in construction to the first embodiment described with reference to FIG. 1 except that three intermediate means or cylinders 11 are bearing on the delivery-and-impression cylinder 15. However, three dye carriers 13 carry dyes whose colors are different from each other. That is, a first print unit 63 develops a red printing image with a magenta, transparent dye; a second print unit 64, a cyan printing image with a cyan, transparent dye; and a third print unit 65, a yellow printing image with a transparent yellow dye. When the red, blue and yellow printing images are transferred onto the recording sheet 16 and registered precisely, a color print may be obtained.

In the fifteenth embodiments, the print heads or water drop generators 3 are shown as being of the water-on-demand type, but it is to be understood that the print heads may be of the electrostatic type described in detail with reference to FIG. 8.

Next the dyes and wetting or moistening liquids used in the present invention will be described in detail. So far the water has been used as an agent for wetting or moistening the dye carried in the intermediate member or drum, but it will be understood that the present invention is not limited to the water and that any liquid substances which will not precipitate any solid substances and may wet or moisten the dye in the intermediate means or drum so that the dye may be transferred to the recording sheet together with the wetting or moistening liquid, may be employed.

Instead of the water-soluble dyes, oil-soluble dyes and pigments may be carried by the intermediate means or drums. That is, the present invention may use any substances which may develop colors when wetted or moistened by the wetting or moistening agents and may be transferred together with the wetting or moistening agents to the recording sheets, but unless the substances are not wetted or moistened, they must remain untransferable.

Therefore there are various combinations between wetting or moistening agents and intermediate means or substances. For instance, they are the combinations of water and water-soluble dyes described above, the combinations of organic solvents and oil-soluble dyes, the combinations of water and pigments, the combinations of organic solvents and pigments and the combinations of water and oil-soluble dyes as will be described in detail below.

First will be described the combinations of organic solvents and oil-soluble dyes. The oil-soluble dyes may be selected depending upon the desired image quality, and the organic solvents are selected depending upon the solubility of the oil-soluble dyes selected. For instance, they are aliphatic hydrocarbons such as Isopar and so on; aromatic hydrocarbons such as toluene, xylene, Solvesso and so on; alcohols such as isopropylalcohol, ethyleneglycol and so on; ketones, ethers and esters and others such as methylisobutylketone, ethyleneglycolmonoethylether, dioxane, ethyl-amyl acetate and so on; monoethanol amine, 2-dimethylaminoethanol amine, dimethyl sulfoxide, dimethylformamide and so on.

Next the steps for forming an intermediate drum will be described. For instance, Sudan deep black BB is dissolved into toluene to prepare a rich mixture, and a drum made of plate is dipped into the mixture. Thereafter the drum is dried by hot air to form a uniform dye carrying layer over the surface of the drum. If ceramic or synthetic resins may be formed or machined with a desired degree of dimensional accuracy, the intermediate drums may be made of them.

Next, the combinations of water and pigments will be described. In general, pigments are excellent in covering power and light resistance, but they are disadvantageous in that they will not be dissolved in water. As a result, they must be so processed that when they are moistened or wetted with water, they may be transferred with the water to the recording sheet. To this end, surface-active agents and water-soluble resins are dispersed into the water so as to prepare a disperse system. Thereafter the disperse system is applied to a support, thereby forming a color developing layer. The pigment may be for instance phthalocyanine blue. Organic and inorganic pigments may be selected depending upon desired image quality. The water-soluble resins, which are binders, may be selected from gelatine, casein, arabian rubber, carboxylmethyl cellulose or its derivatives, polyvinylalcohol, polyvinylpyrolidone, maleic resin and so on. The surface-active agents may be selected from positive ion active agents, negative ion active agents, non-ion surface active agents depending upon the selected pigments. In order to disperse the pigments, ball mills, homo-mixers, colloid mills or the like may be used.

In the color developing layers thus formed, the water-soluble resins are used as the binders so that when the water drops adhere to the color developing layer, the binder in the wetted or moistened spot is dissolved so that the pigment is separate. When the recording sheet is pressed against the color developing layer, the separated pigments together with the binder may be transferred onto the recording sheet.

Next the combinations of organic solvents and pigments will be described. The organic solvents have been already explained above. The pigments are not limited and may be either organic or inorganic pigments. A suitable binder is added to the pigment so as to prepare the pigment suspension which in turn is applied to the base and dried, thereby forming a color developing layer. It is preferable that the binders may be suitably softened and dissolved in the organic solvents. They are for example vinyl acetate resins, copolymers of vinyl chloride and vinyl acetate, polystyrene, polyesters, polyamids, polyvinyl butyral, acrylic resins, methacrylic resins, silicon resins and so on. Careful selection of binders is required because the binders greatly influence the stability of the suspension of pigments.

The combinations of water and oil-soluble dyes may be also used when the oil-soluble dyes are as the pigments.

In order to increase the bonding strength between the base and the color developing layer, a bonding layer may be interposed between them. The materials for the bonding layer must be selected depending upon the properties of the support and color developing layer. The bonding layer may be made of polyvinyl butyral, copolymers of vinylchloride and vinyl acetate, copolymers of maleic anhydride, acrylic resins, polyester, gelatin and other high-molecular compounds. For instance the bonding layer consisting of vinyl acetate may be formed by applying over the base of high-molecular film the mixture of vinyl acetate resin and 10% by weight of toluene by the use of a doctor blade and thereafter drying by hot air. The thickness of the bonding layer is preferably between 2 and 10 microns. The color developing agent is applied over the bonding layer.

In summary, according to the present invention, a liquid, which will not precipitate any solid substances, is issued from a nozzle or orifice and broken into a stream of liquid drops which travel towards and strike against an intermediate means or a printing-image-forming-and-transfer means, forming a printing image. The printing image thus developed is transferred onto a recording sheet which is pressed against the intermediate means, whereby the print may be obtained. As a result, even when the recording apparatus of the present invention is left in the inoperative mode for a long time period, the clogging of nozzle or orifice may be avoided completely. In addition, the intermediate means is used so that the prints in any colors may be produced. Furthermore the recording apparatus in accordance with the present invention is highly reliable and dependable in operation.

What is claimed is:

1. Liquid jet recording apparatus, comprising:

an intermediate recording member comprising a supporting substrate, and a color developing layer of a liquid soluble pigment composition on said substrate, said pigment composition comprising a comminuted pigment dispersed in a binder comprising at least one liquid-soluble resin and at least one surface-active agent, said pigment being insoluble in said liquid;

liquid jet generating means, including a piezoelectric element responsive to a print control signal for issuing a stream of liquid drops in accordance with a pattern to be printed, and means for directing said drops to impinge upon corresponding selected parts of said layer, so that said drops dissolve said binder at said selected parts, thereby rendering the associated pigment separable from said layer; and means for transferring said separable pigment from said layer of said intermediate recording member to a recording sheet in accordance with said pattern, and for fixing the transferred pigment to said sheet.

2. The apparatus according to claim 1, wherein said liquid is water.

3. The apparatus according to claim 2, wherein said pigment comprises phthalocyanine blue.

4. The apparatus according to claim 2, wherein said resin is selected from the group consisting of gelatine, casein, arabian rubber, carboxylmethyl cellulose or its derivatives, polyvinylalcohol, polyvinylpyrolidone, maleic resin, vinyl acetate resins, copolymers of vinyl chloride and vinyl acetate, polystyrene, polyesters, polyamides, polyvinyl butyral, acrylic resins, methacrylic resins, and silicon resins.

5. The apparatus according to claim 2 or 3 or 4, wherein said surface-active agent is selected from the group consisting of positive ion surface-active agents, negative ion surface-active agents, and non-ion surface-active agents.

* * * * *